(12) United States Patent
Lin et al.

(10) Patent No.: US 12,363,411 B2
(45) Date of Patent: Jul. 15, 2025

(54) IMAGE CAPTURING DEVICE

(71) Applicant: Chicony Electronics Co., Ltd., New Taipei (TW)

(72) Inventors: Yu-Hsuan Lin, New Taipei (TW); Chien-Yueh Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 189 days.

(21) Appl. No.: 18/335,140

(22) Filed: Jun. 15, 2023

(65) Prior Publication Data

US 2024/0267604 A1 Aug. 8, 2024

(30) Foreign Application Priority Data

Feb. 2, 2023 (TW) ................. 112103636

(51) Int. Cl.
*H04N 23/56* (2023.01)
*G03B 15/05* (2021.01)
*H04N 23/20* (2023.01)
*H04N 23/50* (2023.01)
*H04N 23/667* (2023.01)

(52) U.S. Cl.
CPC ............ *H04N 23/56* (2023.01); *G03B 15/05* (2013.01); *H04N 23/20* (2023.01); *H04N 23/50* (2023.01); *H04N 23/667* (2023.01); *G03B 2215/0503* (2013.01); *G03B 2215/0567* (2013.01); *G03B 2215/0575* (2013.01)

(58) Field of Classification Search
None
See application file for complete search history.

(56) References Cited

U.S. PATENT DOCUMENTS

2015/0192269 A1* 7/2015 Shih ................ G08B 13/19617
362/297

FOREIGN PATENT DOCUMENTS

| CN | 216217071 | | 4/2022 |
| CN | 216217071 U | * | 4/2022 |
| TW | I491970 | | 7/2015 |

OTHER PUBLICATIONS

"Office Action of Taiwan Counterpart Application", issued on Jan. 18, 2024, p. 1-p. 7.

* cited by examiner

*Primary Examiner* — Xiaolan Xu
(74) *Attorney, Agent, or Firm* — JCIPRNET

(57) ABSTRACT

An image capturing device includes a base, a light sensing element, an image capturing lens, and multiple light sources. The light sensing element is disposed on the base. The image capturing lens is disposed above the light sensing element. The light sources are disposed on the base and arranged beside the image capturing lens. Each of the light sources emits a light beam. A chief ray direction of the light beam has a horizontal component and a vertical component. The horizontal component and the vertical component are both greater than zero.

15 Claims, 10 Drawing Sheets

IMAGE CAPTURING DEVICE

CROSS-REFERENCE TO RELATED APPLICATION

This application claims the priority benefit of Taiwan application serial no. 112103636, filed on Feb. 2, 2023. The entirety of the above-mentioned patent application is hereby incorporated by reference herein and made a part of this specification.

BACKGROUND

Technical Field

The disclosure relates to an electronic device, and more particularly to an image capturing device.

Description of Related Art

With the advancement of optical sensing and monitoring technology, an image sensing and monitoring device in an infrared light band have been gradually developed. By applying an infrared light source and an infrared light sensor to a monitoring device, changes in an external environment may be sensed under a condition of low illumination or no illumination. However, a current infrared image capturing device still has an issue of insufficient flux of illumination light. For example, in a general mode, a light beam emitted by the infrared light source is blocked by a lens barrel, resulting in a dark area in a center of an image. When a lens is rotated by 90 degrees and switched to a corridor mode, the dark area is generated at an edge of the image due to the low illuminance.

SUMMARY

The disclosure provides an image capturing device, which may improve an issue of insufficient flux of illumination light.

An image capturing device in the disclosure includes a base, a light sensing element, an image capturing lens, and multiple light sources. The light sensing element is disposed on the base. The image capturing lens is disposed above the light sensing element. The light sources are disposed on the base and arranged beside the image capturing lens. Each of the light sources is configured to emit a light beam. A chief ray direction of the light beam has a horizontal component and a vertical component. The horizontal component and the vertical component are both greater than zero.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
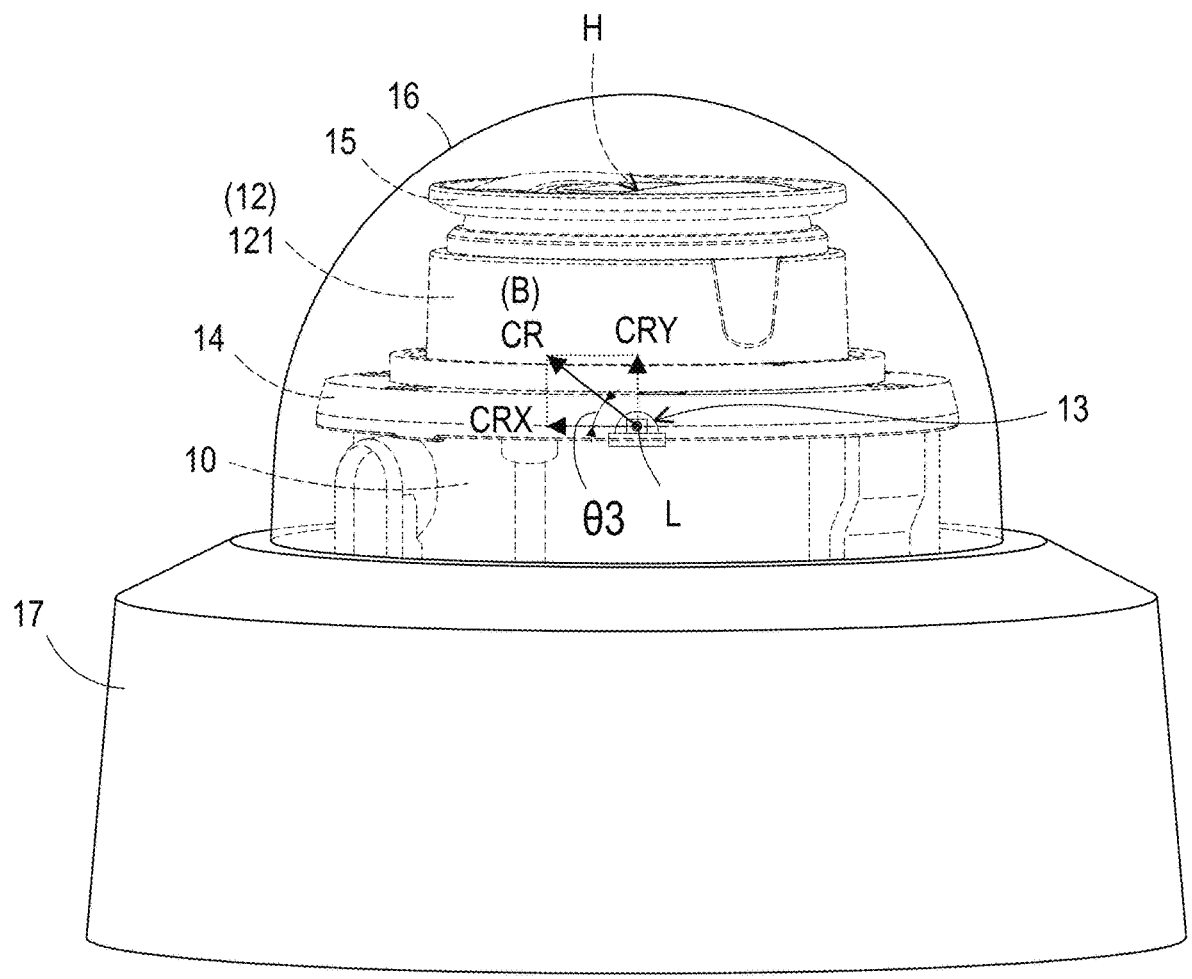
FIGS. 1 to 3 are respectively a schematic side view, a schematic top view, and a schematic cross-sectional view of an image capturing device according to the first embodiment of the disclosure.

Direction terms mentioned in this specification, such as such as "up," "down," "front," "back," "left," and "right," merely refer to directions in the accompanying drawings. Therefore, the direction terms used is for illustration, not for limiting this disclosure. In addition, the disposition of one element/film layer on (or above) another element/film layer can encompass the element/film layer being directly disposed on (or above) the other element/film layer, with the two elements/film layers being in direct contact with each other, and the element/film layer being indirectly disposed on (or above) the other element/film layer, with one or more elements/film layers located between the two elements/film layers.

In the accompanying drawings, each drawing depicts general features of methods, structures, or materials used in specific embodiments. However, these drawings should not be construed as defining or limiting the scope or nature covered by these embodiments. For example, for clarity, the relative size, thickness and position of each layer, region or structure may be reduced or enlarged.

In the following embodiments, the same or similar elements will be denoted by the same or similar reference numerals, and repeated description thereof will be omitted. In addition, the features in different embodiments can be combined without conflict, and all simple equivalent changes and modifications made in accordance with the present specification or claims still fall within the scope of the disclosure.

Figure 2:
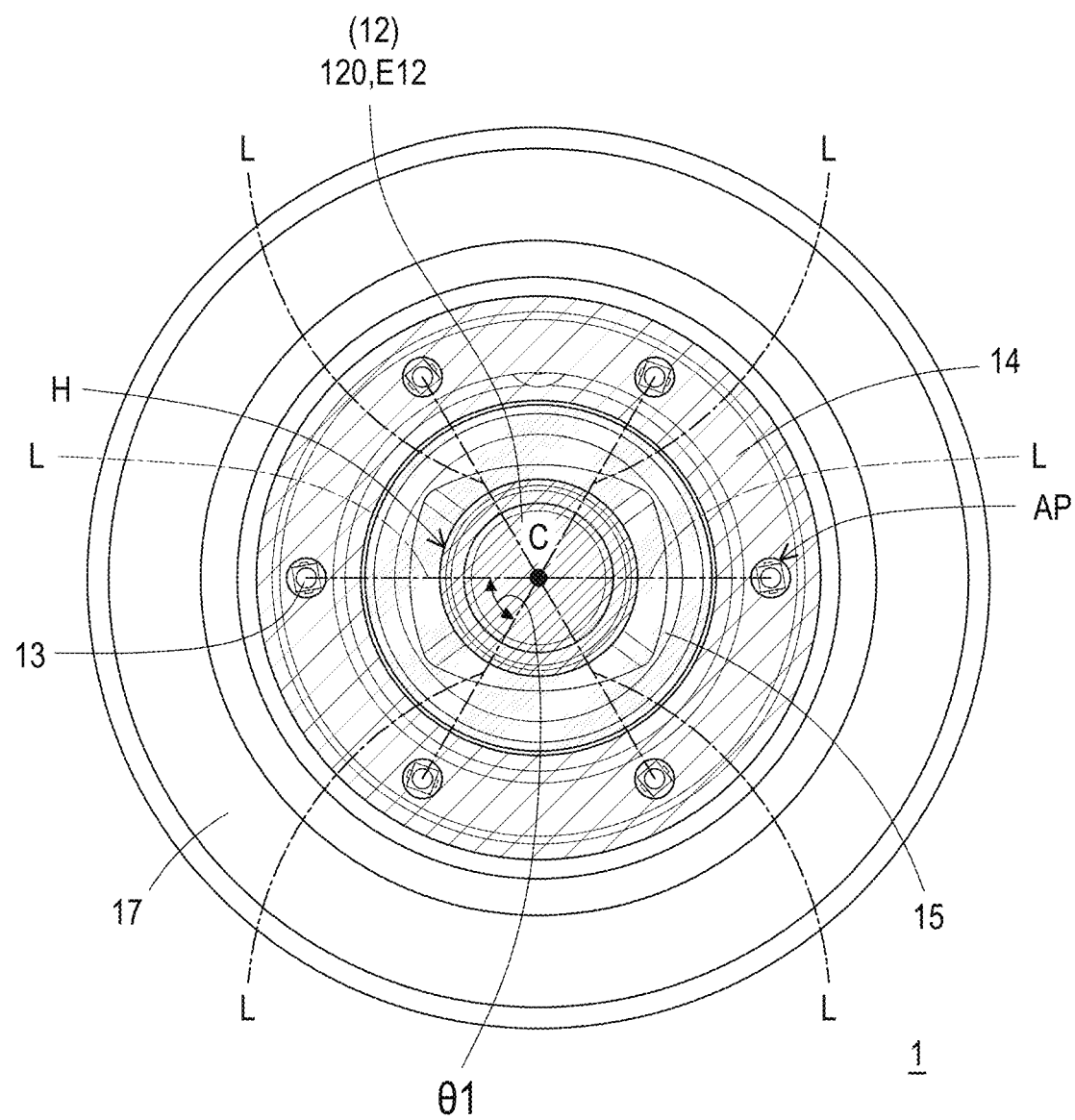
Figure 3:
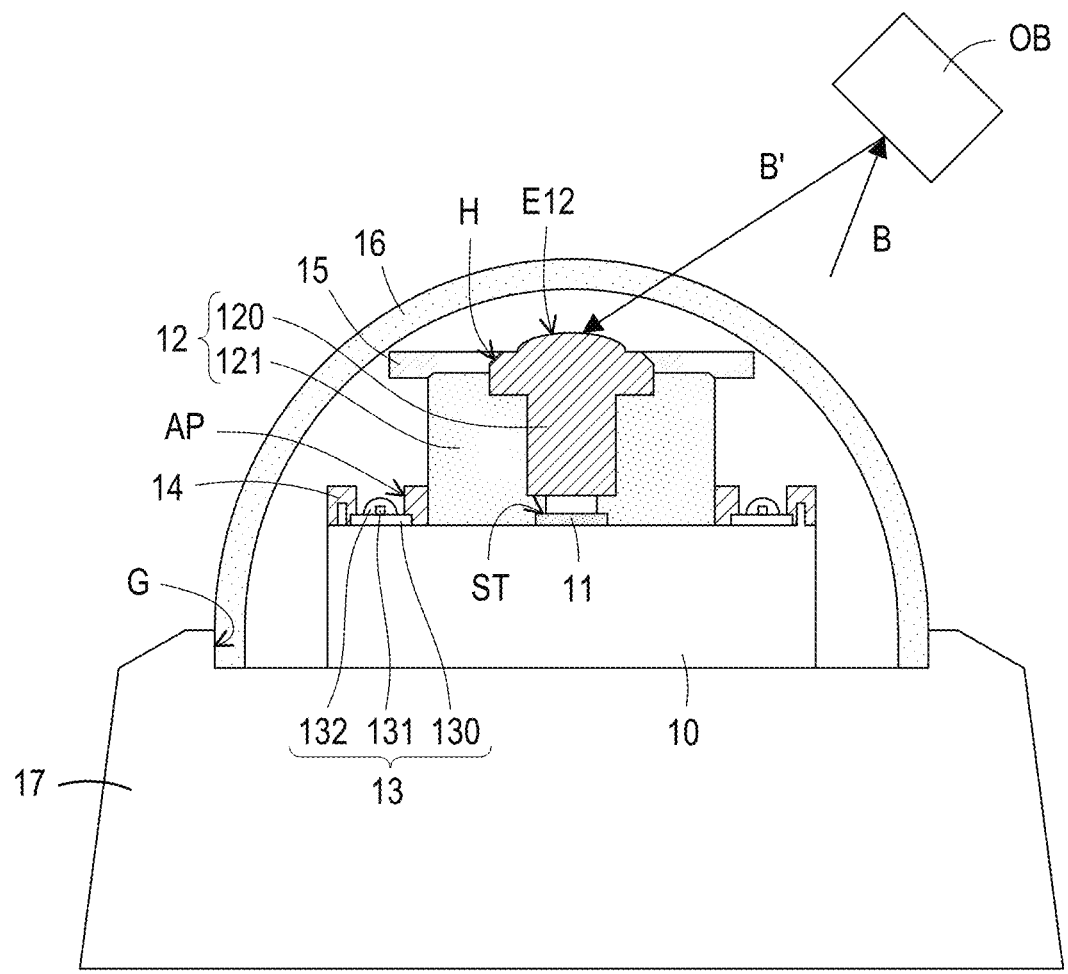

FIGS. 1 to 3 are respectively a schematic side view, a schematic top view, and a schematic cross-sectional view of an image capturing device according to the first embodiment of the disclosure. Referring to FIG. 3 firstly, an image capturing device 1 may include a base 10, a light sensing element 11, an image capturing lens 12, and multiple light sources 13.

The base 10 may be configured to carry the light sensing element 11, the image capturing lens 12, and the light sources 13, and the base 10 may include a circuit (not shown), so as to electrically connect electronic elements (such as the light sensing element 11, the light sources 13, etc.) in the image capturing device 1 to an external circuit (such as a power source, which is not shown). For example, the base 10 may include a circuit board, such as a printed circuit board, but the disclosure is not limited thereto. It should be understood that cross-sectional shapes, interconnection methods, and detailed designs of the elements in FIG. 3 are only examples and may be changed according to actual requirements.

The light sensing element 11 is disposed on the base 10, and the light sensing element 11 may be electrically connected to the base 10. For example, the light sensing element 11 may be electrically connected to the external circuit through the circuit of the base 10, but the disclosure is not limited thereto. The light sensing element 11 is configured to sense a light beam (such as a light beam B'). For example, the light sensing element 11 may include an image sensor, such as a complementary metal oxide semiconductor image sensor (CMOS image sensor) or a charge coupled device (CCD), but the disclosure is not limited thereto.

In some embodiments, the light sensing element 11 may be selective to a light band, and the light band sensed by the light sensing element 11 may cover at least part of a band of a light beam B from the light source 13. For example, the light beam B may be an infrared light beam with a wavelength in a range of 850 nanometers (nm) to 940 nm, and the light sensing element 11 may be an image sensor for detecting the infrared light beam. However, the disclosure is not limited thereto. In other embodiments, the light beam B may also be a visible light beam or an ultraviolet light beam, and the light sensing element 11 may be an image sensor for detecting the visible light beam or the ultraviolet light beam.

The image capturing lens 12 is disposed above the light sensing element 11. The image capturing lens 12 is configured to transmit the received light beam B' to the light sensing element 11. For example, the image capturing lens 12 may include a lens module 120 and a mechanical member 121. The lens module 120 may adopt a design of a known lens (such as a wide-angle lens, a non-wide-angle lens, a fisheye lens, etc.) and may include multiple lenses, but the disclosure is not limited thereto. The mechanical member 121 is disposed on the base 10 and surrounds the lens module 120. The mechanical member 121 may be configured to fix the lens module 120 above the light sensing element 11 and may adjust a distance between the lenses to adjust a focal length of the image capturing lens 12.

In some embodiments, the image capturing lens 12 and the light sensing element 11 may rotate together, and the image capturing device 1 may have a general mode and a corridor mode. An image captured by the image capturing device 1 in the general mode and an image captured by the image capturing device 1 in the corridor mode have different aspect ratios. For example, an aspect ratio of the image captured by the image capturing device 1 in the general mode is 16:9, and an aspect ratio of the image captured by the image capturing device 1 in the corridor mode is 9:16. However, the disclosure is not limited thereto.

The light sources 13 are disposed on the base 10 and arranged beside the image capturing lens 12 (as shown in FIG. 2). In FIG. 2, elements (such as a protection cap 16) on the light source 13 are omitted to clearly show a relative configuration relationship between the light source 13 and other elements. In addition, FIG. 2 schematically shows the six light sources 13. However, it should be understood that the number of light sources 13 may be changed according to requirements, and is not limited to six. For example, in other embodiments, although not shown, the number of light sources 13 may be four, five, seven, eight, ten, or twelve to enhance supplementary light or for other purposes, but the disclosure is not limited thereto.

In some embodiments, the light sources 13 may be arranged beside the image capturing lens 12 along a circumferential direction. In addition, the light sources 13 arranged beside the image capturing lens 12 may be arranged at equal angles to improve uniformity of light emitting. Taking the six light sources 13 as an example, an included angle $\theta1$ between a connection line L between any one of the light sources 13 and a center C of the image capturing lens 12 and the connection line L between the adjacent light source 13 and the center C of the image capturing lens 12 may be 60 degrees (that is, 360 degrees divided by six). When the number of light sources 13 is ten, the included angle $\theta1$ may be 36 degrees (that is, 360 degrees divided by ten). The included angle $\theta1$ corresponding to other numbers of light sources 13 may be derived by analog. Therefore, the same details will not be repeated in the following. In addition, in other embodiments, according to the actual requirements, other light sources may be further added on the basis of the configuration of the above light source in the disclosure, so as to enhance the supplementary light or for other purposes. For example, on the basis of the configuration of the six light sources 13 above, at least one additional light source (not shown) for the supplementary light may be disposed between two of the light sources 13.

Figure 5:
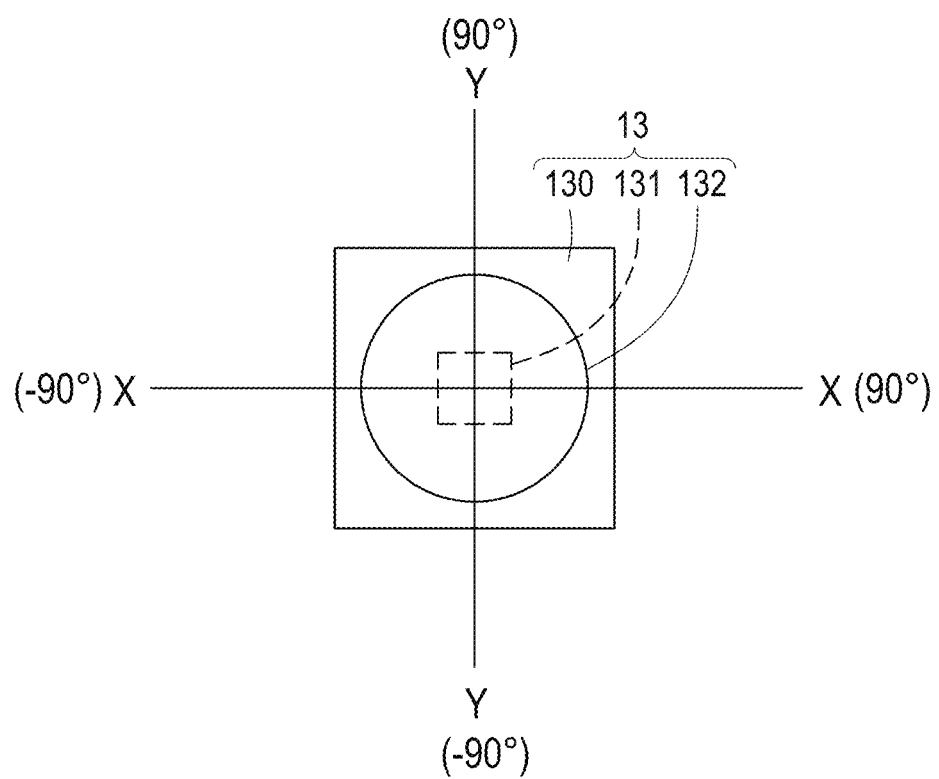
FIG. 5 is a schematic top view of a light source according to the disclosure.

FIG. 5 is a schematic top view of a light source according to the disclosure. Referring to FIG. 3 and FIG. 5, each of the light sources 13 is configured to emit the light beam B. When the light beam B is irradiated to an object OB to be imaged, the light beam B is reflected by the object OB. The light beam B' reflected by the object OB is transmitted to the light sensing element 11 through the image capturing lens 12, and a subsequent image processing and analysis is continued. For example, each of the light sources 13 may include a circuit board 130, a light emitting element 131, and an optical element 132, but the disclosure is not limited thereto. The circuit board 130 is disposed on the base 10 and electrically connected to the base 10. The light emitting element 131 is disposed on the circuit board 130 and electrically connected to the circuit board 130, and the light emitting element 131 may be electrically connected to the base 10 through the circuit board 130. For example, the light emitting element 131 may include an infrared light emitting diode, and the light beam B from the light emitting element 131 may be the infrared light beam. However, the disclosure is not limited thereto. In other embodiments, the light emitting element 131 may include a visible light emitting diode or an ultraviolet light emitting diode, and the light beam B may be the visible light beam or the ultraviolet light beam. However, the disclosure is not limited thereto. The optical element 132 is disposed on the circuit board 130 and covers the light emitting element 131. The optical element 132 may be a hemispherical secondary optical element to adjust a light pattern of the light beam B emitted by the light source 13, but the disclosure is not limited thereto.

As shown in FIG. 1, a chief ray direction CR of the light beam B has a horizontal component CRX and a component CRY. FIG. 1 schematically shows the single light source 13 to clearly show a relative relationship between the chief ray direction CR, the horizontal component CRX, the vertical component CRY and the connection line L between the light source 13 and the center C (see FIG. 2) of the image capturing lens 12. The chief ray direction CR of the light beam B refers to a direction in which light intensity of the light beam B has a maximum value. The horizontal component CRX refers to a component of the chief ray direction CR on a horizontal reference plane (not shown) parallel to a top surface ST (referring to FIG. 3) of the light sensing element 11, and the vertical component CRY refers to a component of the chief ray direction CR on a vertical reference surface (not shown) perpendicular to the top surface ST (referring to FIG. 3) of the light sensing element 11.

Figure 4:
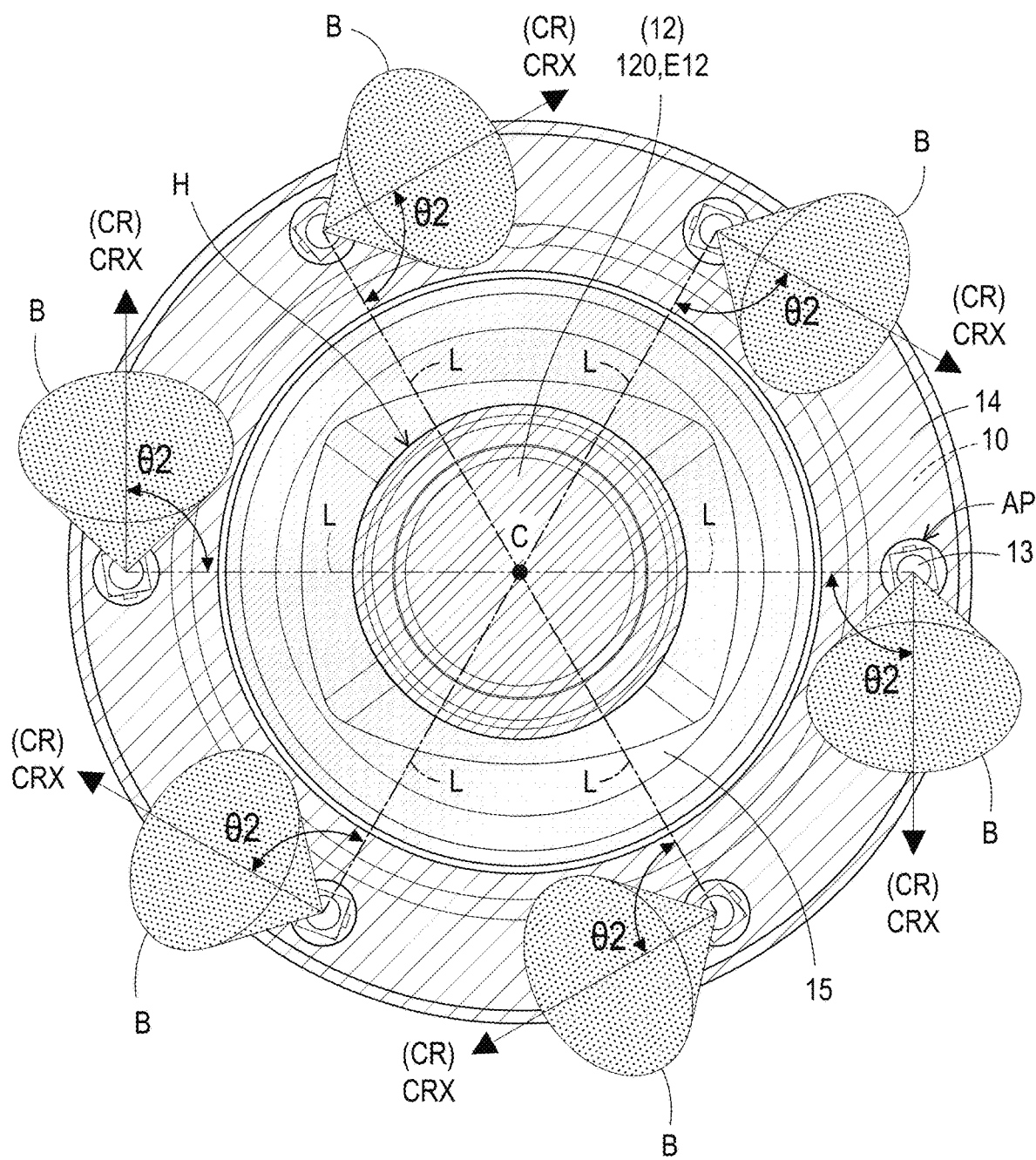
FIG. 4 is a schematic partially enlarged view of FIG. 2, which shows a state of a light beam emitted by a light source.

FIG. 4 is a schematic partially enlarged view of FIG. 2, which shows a state of a light beam emitted by a light source. As shown in FIG. 4, the light sources 13 may include multiple light emitting diodes that emit light obliquely (for example, the light emitting element 131 in FIG. 3 is a light emitting diode that emits the light obliquely), so that the horizontal component CRX and the vertical component CRY in FIG. 1 are both greater than zero. In some embodiments, as shown in FIG. 4, the light sources 13 may emit the light toward the same side. For example, each of the light sources 13 emits the light toward a right side, so that the horizontal component CRX rotates clockwise. However, the disclosure is not limited thereto. For example, in other embodiments, although not shown, each of the light sources 13 may emit the light toward a left side, so that the horizontal component CRX rotates counterclockwise, for example.

In some embodiments, the horizontal component CRX may be perpendicular to the connection line L between the light source 13 that emits the light beam B and the center C (see FIG. 2) of the image capturing lens 12 (the connection line L in FIG. 1 extends, for example, in a direction perpendicular to a paper plane). Considering a process accuracy and/or process error, the vertical may cover a tolerance within 5 degrees. As shown in FIG. 4, an included angle θ2 between the horizontal component CRX and the connection line L is, for example, between 85 degrees and 95 degrees, that is, 85 degrees≤θ2≤95 degrees. In addition, in some embodiments, as shown in FIG. 1, an included angle θ3 between the chief ray direction CR and the horizontal component CRX may decrease as the number of light sources 13 increases, and the included angle θ3 may increase as the number of light sources 13 decreases. In some embodiments, the included angle θ3 is, for example, between 30 degrees and 60 degrees, that is, 30 degrees≤θ3≤60 degrees, so as to facilitate commercialization, reduce process difficulties, reduce process cost, or increase flux of illumination light.

Through the design that the light beam B is obliquely emitted from the image capturing device 1 and the horizontal component CRX is perpendicular to the connection line L (that is, a radial direction of the image capturing lens), it may reduce a degree of shielding of the light beam B by the image capturing lens 12 (such as the mechanical member 121), so as to increase brightness of a center of the image in the general mode, and help to improve illuminance at an edge in the corridor mode or reduce a dark area in the corridor mode.

Figure 6A:
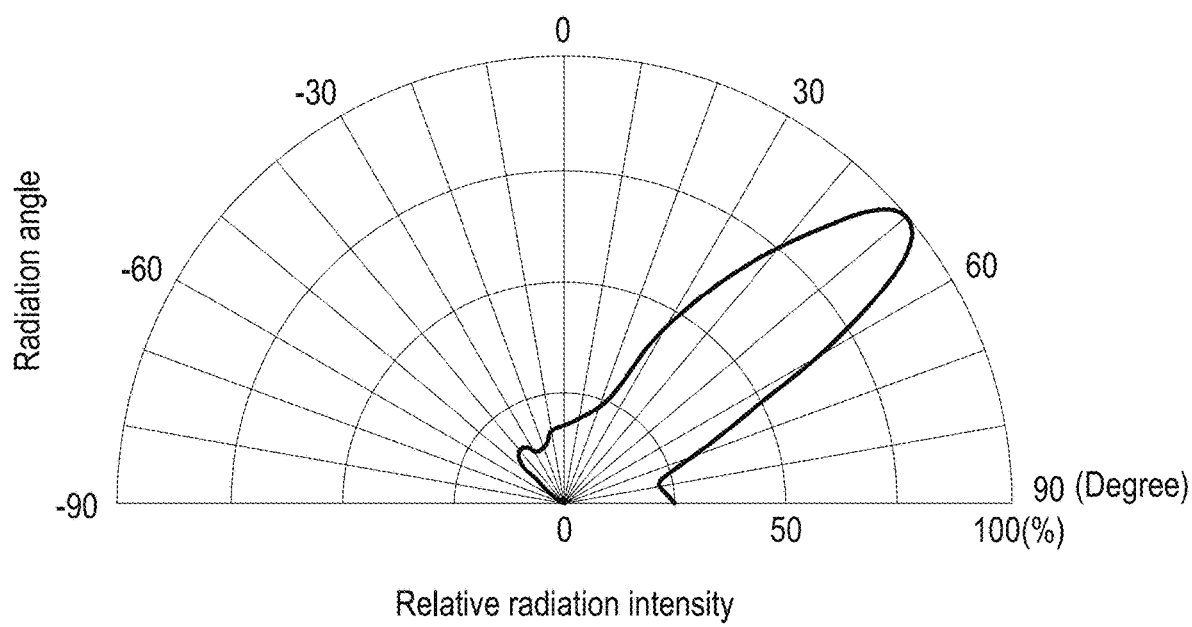
FIG. 6A and FIG. 6B are distributions of light patterns at a section line X-X and a section line Y-Y in FIG. 5, respectively.
Figure 6B:
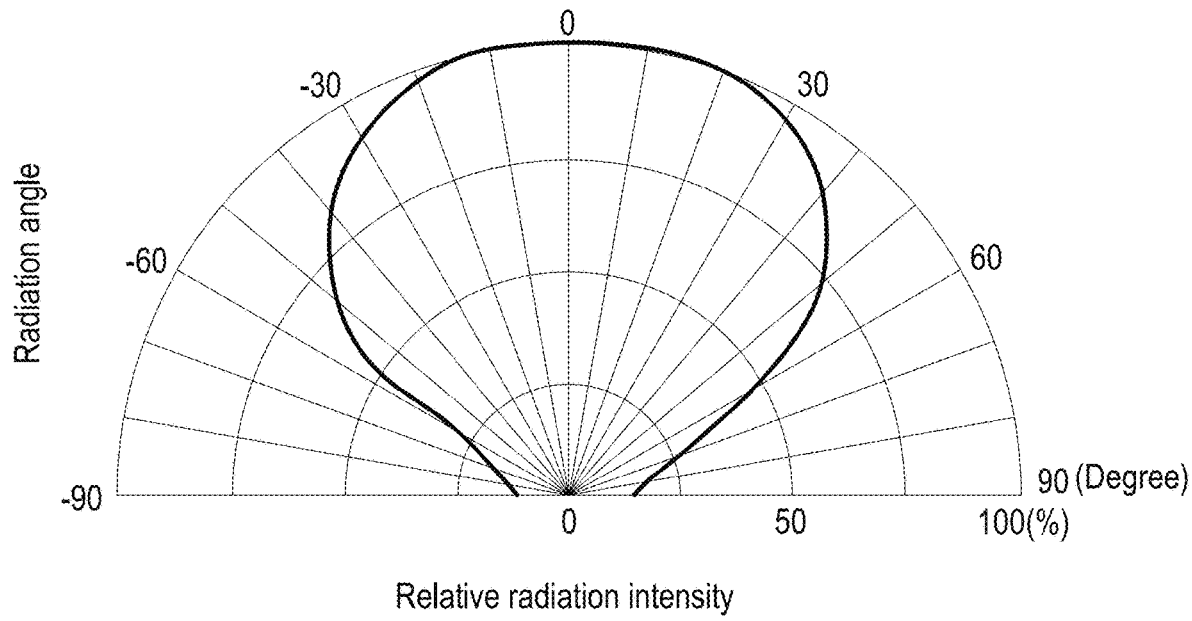

FIG. 6A and FIG. 6B are distributions of light patterns at a section line X-X and a section line Y-Y in FIG. 5, respectively. Referring to FIGS. 5 to 6B, the light emitting element 131 that emits the light obliquely may be an off-axis light emitting diode. That is, the chief ray direction of the light beam emitted from the light source 13 is inclined relative to a surface of the circuit board 130, not perpendicular and not parallel to the surface of the circuit board 130, so that the distribution the light pattern at at least one section line (such as the section line X-X or the section line Y-Y) is an asymmetric distribution. For example, in FIG. 6A, the strongest relative radiation intensity occurs at a radiation angle (e.g. the included angle θ3 in FIG. 1) of 51 degrees, and the relative radiation intensity gradually decreases from the radiation angle of 51 degrees to two sides (the asymmetric distribution of the light pattern). On the other hand, in FIG. 6B, the strongest relative radiation intensity occurs at a radiation angle of 0 degrees, and the relative radiation intensity gradually decreases from the radiation angle of 0 degrees to the two sides (a symmetrical distribution of the light pattern).

Figure 7:
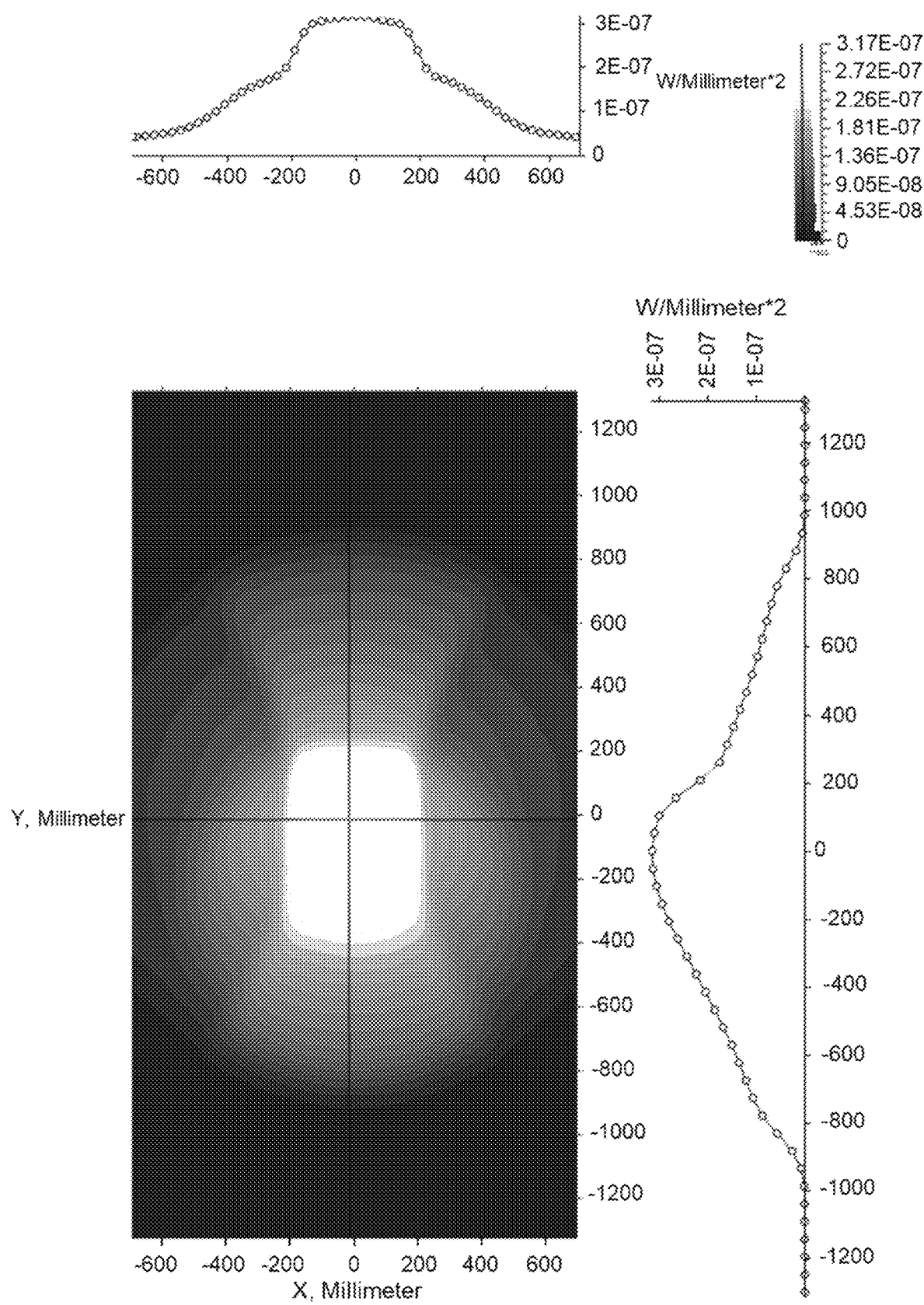
FIG. 7 is a simulation diagram of a distribution of illuminance at a distance of one meter from an image capturing device of a comparative example in a corridor mode.
Figure 8:
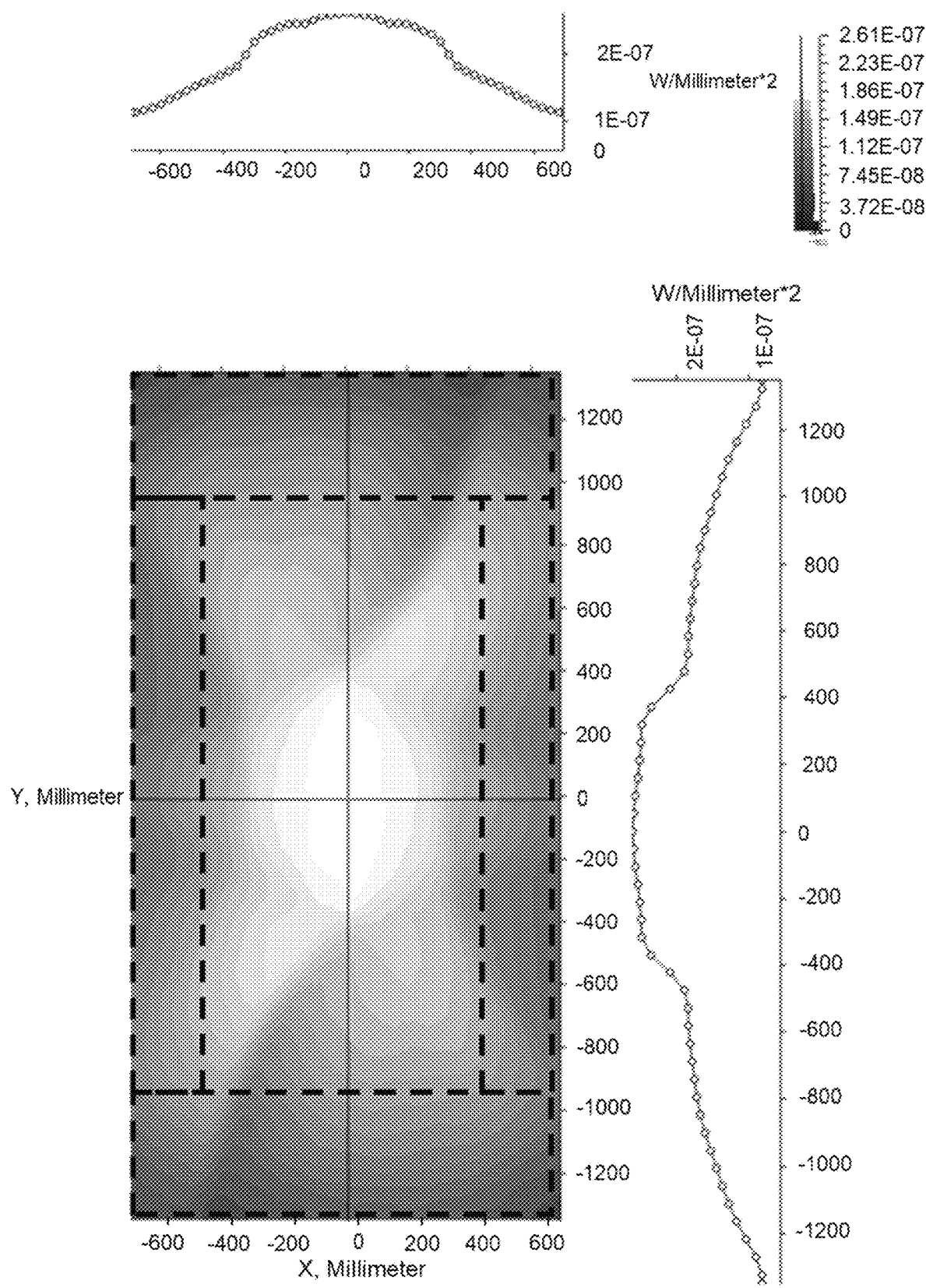
FIG. 8 is a simulation diagram of a distribution of illuminance at a distance of one meter from an image capturing device of the first embodiment in a corridor mode.

FIG. 7 is a simulation diagram of a distribution of illuminance at a distance of one meter from an image capturing device of a comparative example in a corridor mode. FIG. 8 is a simulation diagram of a distribution of illuminance at a distance of one meter from an image capturing device of the first embodiment in a corridor mode. The image capturing device of the comparative example in FIG. 7 adopts a structure of a non-off-axis light emitting diode. According to FIG. 7 and FIG. 8, compared to the structure of the non-off-axis light emitting diode, a design adopting the above off-axis light emitting diode may improve a conventional issue of the dark area caused by the insufficient illuminance at the edge (in FIG. 8, the illuminance at an area enclosed by dashed lines is increased).

Through a simulation analysis, compared to the structure of the non-off-axis light-emitting diode, the design adopting the above off-axis light emitting diode may improve light efficiency (or luminous flux) received by a far-field receiving surface from 0.2462 watts to 0.8078 watts in the general mode, with a gain of 228%. In addition, in the corridor mode, minimum illuminance is increased from 1.8 watts per square millimeter to 6.6 watts per square millimeter, with a gain of 266%, and a ratio of the minimum illuminance divided by maximum illuminance in the center may be increased from 5.7% to 25.48%, with a gain of 347%.

According to different requirements, the image capturing device 1 may further include other elements and/or film layers. As shown in FIG. 3, the image capturing device 1 may further include an upper cover 14, a light shielding member 15, the protection cap 16, and a casing 17, but the disclosure is not limited thereto.

The upper cover 14 is mounted on the base 10 and surrounds the image capturing lens 12. The upper cover 14 may cover the base 10 to beautify an appearance. For example, the upper cover 14 may be a black plastic member, but the disclosure is not limited thereto. In addition, the upper cover 14 may have multiple apertures AP. The apertures AP respectively expose the light sources 13 to reduce the shielding of the light beam B.

The light shielding member 15 is disposed on the image capturing lens 12 to block the light beam B emitted by the light source 13 from being directly irradiated to the image capturing lens 12. For example, the light shielding member 15 may be black rubber, but the disclosure is not limited thereto. In addition, the light shielding member 15 has an opening H. The opening H exposes a light incident position E12 of the image capturing lens 12, so that the image capturing lens 12 receives the light beam B' reflected by the object OB.

The protection cap 16 covers the light shielding member 15 and the image capturing lens 12. The protection cap 16 protects (for example, scratch resistant) the elements located therebelow. In some embodiments, the protection cap 16 may be a light-transmitting hemispherical casing for optical and/or dust-proof purposes. The light beam B' from the object OB passes through the protection cap 16 to be transmitted to the image capturing lens 12, and then is imaged by the image capturing lens 12 on the light sensing element 11. However, in other embodiments, the image capturing device 1 may not include the protection cap 16.

The casing 17 may be configured to carry and accommodate the base 10 and protection cap 16. For example, the casing 17 may have a groove G for accommodating the base 10 and the protection cap 16. In addition, the casing 17 may be a metal casing to facilitate heat dissipation or reduce weight, but the disclosure is not limited thereto.

Figure 9:
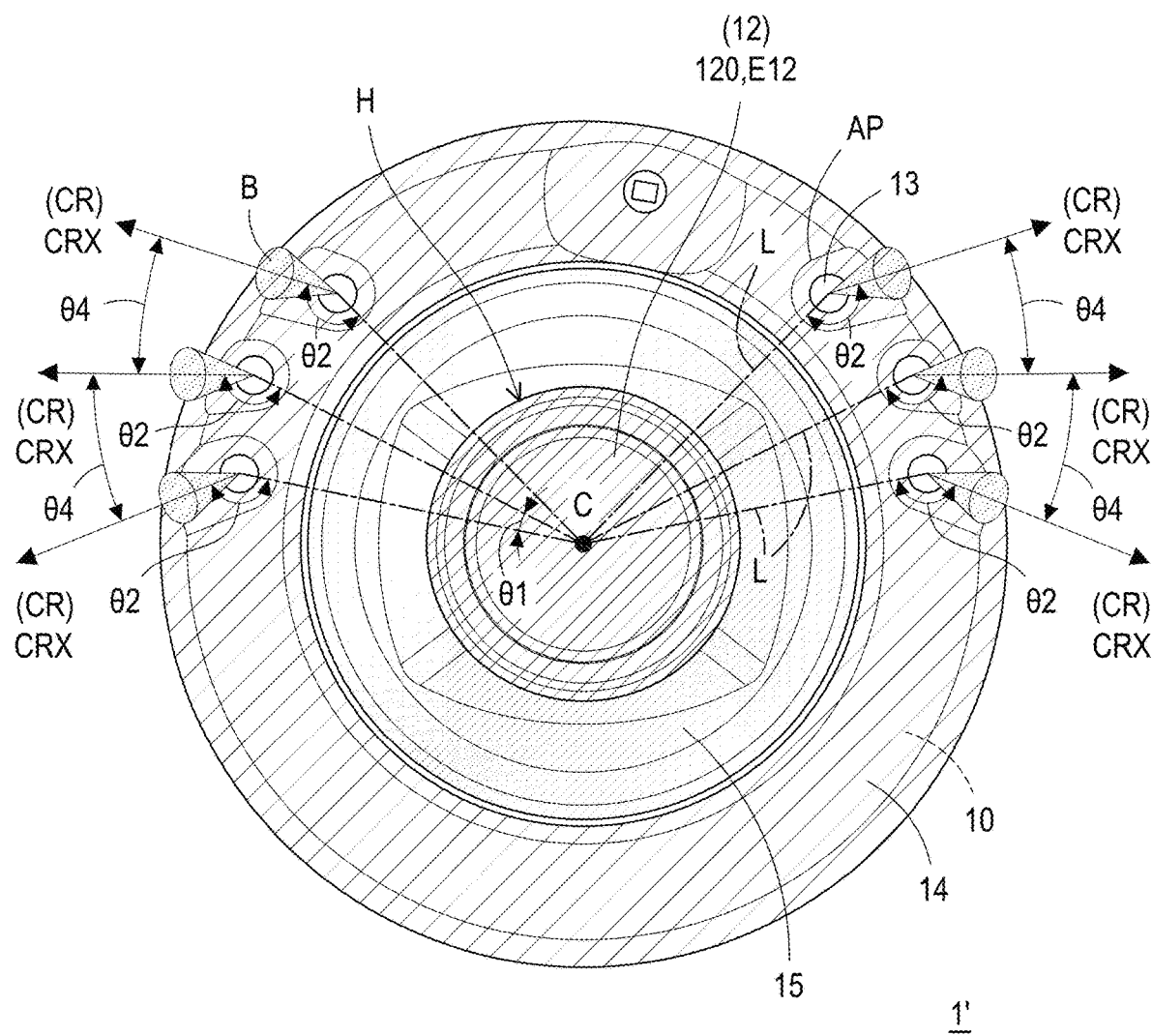
FIG. 9 is a schematic partially enlarged top view of an image capturing device according to the second embodiment of the disclosure.

FIG. 9 is a schematic partially enlarged top view of an image capturing device according to the second embodiment of the disclosure. In FIG. 9, the elements (such as the protection cap 16 in FIG. 1) above the light source 13 and the casing 17 are omitted to clearly show the relative configuration relationship between the light source 13 and other elements. Referring to FIG. 9, a main difference between an image capturing device 1' and the image capturing device 1 in FIG. 2 lies in the configuration and distribution of the light sources 13.

In detail, viewed from a top view of image capturing device 1', as shown in FIG. 9, the block 10 is divided into an upper half and a lower half, for example. The light sources 13 are, for example, disposed on the upper half of the base 10, and are disposed on two sides (such as a left side and a right side of the center C) of the center C of the image capturing lens 12 in a mirror-image fashion, and the included angle θ2 between the connection line L between the light source 13 and the center C of the image capturing lens 12 and the horizontal component CRX is, for example, greater than 90 degrees and less than 180 degrees. In some embodiments, the included angles θ2 corresponding to the light sources 13 may be different. In addition, in some embodiments, an included angle θ4 between the two horizontal components CRX corresponding to the two adjacent light sources 13 may be between 10 degrees and 30 degrees, that is, 10 degrees≤θ4≤30 degrees. For example, the included angle θ4 may be 20 degrees, but the disclosure is not limited thereto.

Figure 10:
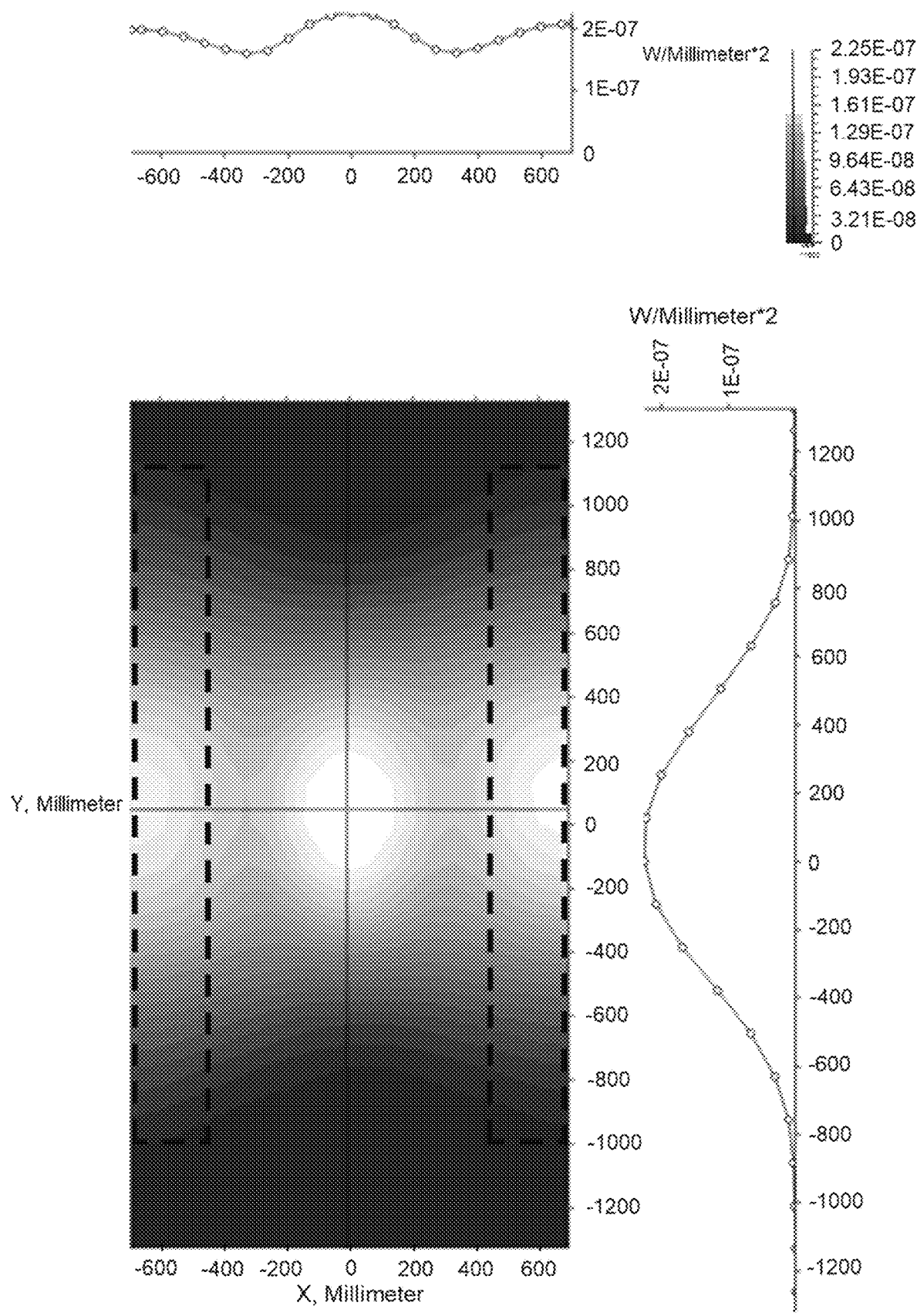
FIG. 10 is a simulation diagram of a distribution of illuminance at a distance of one meter from an image capturing device of the second embodiment in a corridor mode.

FIG. 10 is a simulation diagram of a distribution of illuminance at a distance of one meter from an image capturing device of the second embodiment in a corridor mode. According to FIG. 7 and FIG. 10, compared to the structure of the non-off-axis light emitting diode, the design adopting the above off-axis light emitting diode may improve the conventional issue of the dark area caused by the insufficient illuminance at the edge (in FIG. 10, the illuminance at the area enclosed by the dashed lines is increased).

Through the simulation analysis, compared to the structure of the non-off-axis light-emitting diode, the design adopting the above off-axis light emitting diode may improve the light efficiency received by the far-field receiving surface from 0.2462 watts to 0.5587 watts in the general mode, with a gain of 126%. In addition, in the corridor mode, the minimum illuminance is increased from 1.8 watts per square millimeter to 3.05 watts per square millimeter, with a gain of 69%, and the ratio of the minimum illuminance divided by maximum illuminance in the center may be increased from 5.70% to 13.56%, with a gain of 137%.

Based on the above, in the embodiments of the disclosure, through the light beam obliquely exiting the image capturing device (the horizontal component and the vertical component of the light beam are both greater than zero), it may reduce the degree of shielding of the light beam by the image capturing lens, increase the light efficiency in the general mode, and help to improve the illuminance at the edge in the corridor mode or reduce the dark area in the corridor mode. Therefore, the image capturing device in the embodiments of the disclosure may improve the issue of the insufficient flux of the illumination light.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image capturing device, comprising:
   a base;
   a light sensing element disposed on the base;
   an image capturing lens disposed above the light sensing element; and
   a plurality of light sources disposed on the base and arranged beside the image capturing lens, wherein each of the light sources is configured to emit a light beam, a chief ray direction of the light beam has a horizontal component and a vertical component, and the horizontal component and the vertical component are both greater than zero,
   wherein an included angle between a connection line between the light source emitting the light beam and a center of the image capturing lens and the horizontal component is between 85 degrees and 95 degrees.

2. The image capturing device according to claim 1, wherein an included angle between the chief ray direction and the horizontal component is between 30 degrees and 60 degrees.

3. The image capturing device according to claim 1, wherein the light sources arranged beside the image capturing lens are arranged at equal angles.

4. The image capturing device according to claim 1, wherein the light sources comprise a plurality of infrared light emitting diodes, and the light beam is an infrared light beam.

5. The image capturing device according to claim 1, wherein the light sources comprise a plurality of light emitting diodes that emit light obliquely.

6. The image capturing device according to claim 1, further comprising:
   an upper cover mounted on the base and surrounding the image capturing lens, wherein the upper cover has a plurality of apertures, and the apertures respectively expose the light sources.

7. The image capturing device according to claim 6, wherein the upper cover is a black plastic member.

8. The image capturing device according to claim 1, further comprising:
   a light shielding member disposed on the image capturing lens and having an opening, wherein the opening exposes a light incident position of the image capturing lens.

9. The image capturing device according to claim 8, further comprising:
   a protection cap covering the light shielding member and the image capturing lens.

10. The image capturing device according to claim 9, further comprising:
    a casing having a groove for accommodating the base and the protection cap.

11. The image capturing device according to claim 1, wherein the light sources are arranged beside the image capturing lens along a circumferential direction.

12. The image capturing device according to claim 1, wherein the image capturing device has a general mode and a corridor mode, and an image captured by the image capturing device in the general mode and an image captured by the image capturing device in the corridor mode have different aspect ratios.

13. The image capturing device according to claim 1, wherein the light sources emit light toward a same side.

14. An image capturing device, comprising:
- a base;
- a light sensing element disposed on the base;
- an image capturing lens disposed above the light sensing element; and
- a plurality of light sources disposed on the base and arranged beside the image capturing lens, wherein each of the light sources is configured to emit a light beam, a chief ray direction of the light beam has a horizontal component and a vertical component, and the horizontal component and the vertical component are both greater than zero,
- wherein viewed from a top view of the image capturing device, the light sources are disposed on two sides of a center of the image capturing lens in a mirror-image fashion, and wherein viewed from the top view of the image capturing device, the light sources are disposed on a half of the base, and an included angle between a connection line between the light source and the center of the image capturing lens and the horizontal component is greater than 90 degrees and less than 180 degrees.

15. The image capturing device according to claim 14, wherein an included angle between the two horizontal components corresponding to the two adjacent light sources is between 10 degrees and 30 degrees.

* * * * *